US009770785B2

(12) United States Patent
Hu et al.

(10) Patent No.: US 9,770,785 B2
(45) Date of Patent: Sep. 26, 2017

(54) SYSTEM AND METHOD FOR FORMING A COOLING HOLE IN AN AIRFOIL

(71) Applicant: General Electric Company, Schenectady, NY (US)

(72) Inventors: Zhaoli Hu, Greer, SC (US); Abe Denis Darling, Laurens, SC (US); Shamgar Elijah McDowell, Simpsonville, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 14/546,357

(22) Filed: Nov. 18, 2014

(65) Prior Publication Data
US 2016/0138405 A1 May 19, 2016

(51) Int. Cl.
*B23K 26/14* (2014.01)
*B23K 26/16* (2006.01)
*B23K 26/384* (2014.01)
*B23K 26/382* (2014.01)
*B23K 26/142* (2014.01)
*B23K 101/00* (2006.01)

(52) U.S. Cl.
CPC .......... *B23K 26/389* (2015.10); *B23K 26/142* (2015.10); *B23K 2201/001* (2013.01); *F05D 2230/13* (2013.01)

(58) Field of Classification Search
CPC .... B23K 26/38; B23K 26/384; B23K 26/389; B23K 26/14; B23K 26/16; B26D 7/10; F01D 5/18

USPC ............................ 219/121.7, 121.71, 121.84
See application file for complete search history.

(56) References Cited

U.S. PATENT DOCUMENTS 4,027,137 A 5/1977 Liedtke
4,873,414 A 10/1989 Ma et al.
(Continued)

FOREIGN PATENT DOCUMENTS

EP 0937533 8/1999
EP 2826586 1/2015
(Continued)

OTHER PUBLICATIONS

U.S. Appl. No. 14/626,955, filed Feb. 20, 2015.
(Continued)

*Primary Examiner* — Samuel M Heinrich
(74) *Attorney, Agent, or Firm* — Dority & Manning, P.A.

(57) ABSTRACT

A system for forming a cooling hole in an airfoil includes a liquid-jet guided laser. The liquid-jet guided laser generates a laser beam confined within a fluid column. The fluid column/laser beam is directed at an outer surface of the airfoil. The system also includes a purge medium supply that is fluidly coupled to an aperture of the airfoil. The purge medium supply provides a purge medium into an inner cavity of the airfoil. The purge medium flow is oriented to flow in a flow direction that is substantially parallel to an inner surface of the cavity. A cooling hole is formed in the airfoil and extends through the outer surface and penetrates the inner surface of the cavity. A centerline of the cooling hole forms an acute angle with respect to the purge medium flow direction. The system described herein provides a method for manufacturing an airfoil.

20 Claims, 6 Drawing Sheets

(56) References Cited

U.S. PATENT DOCUMENTS

| | | | |
|---|---|---|---|
| 4,905,310 A | 2/1990 | Ulrich | |
| 4,931,615 A | 6/1990 | Muncy et al. | |
| 4,940,880 A | 7/1990 | Klingel et al. | |
| 4,952,771 A | 8/1990 | Wrobel | |
| 5,182,434 A | 1/1993 | Nakata | |
| 5,222,617 A | 6/1993 | Gregory et al. | |
| 5,367,144 A | 11/1994 | Matsumura et al. | |
| 5,374,803 A | 12/1994 | Yamada | |
| 5,651,662 A * | 7/1997 | Lee | F01D 5/186 416/95 |
| 5,773,791 A | 6/1998 | Kuykendal | |
| 5,902,499 A | 5/1999 | Richerzhagen | |
| 6,001,219 A | 12/1999 | Caspar | |
| 6,140,604 A | 10/2000 | Somers et al. | |
| 6,696,666 B2 | 2/2004 | Merdan et al. | |
| 7,163,875 B2 | 1/2007 | Richerzhagen | |
| 7,728,258 B2 | 6/2010 | Richerzhagen et al. | |
| 8,581,141 B2 | 11/2013 | Muratsubaki et al. | |
| 8,969,760 B2 * | 3/2015 | Hu | F01D 5/186 219/121.7 |
| 9,003,936 B2 * | 4/2015 | Chillman | B24C 1/045 83/168 |
| 2004/0224179 A1 | 11/2004 | Sokol et al. | |
| 2006/0096964 A1 | 5/2006 | Fordahl | |
| 2007/0193990 A1 | 8/2007 | Richerzhagen et al. | |
| 2007/0278195 A1 | 12/2007 | Richerzhagen et al. | |
| 2009/0001061 A1 | 1/2009 | Beck et al. | |
| 2009/0314753 A1 | 12/2009 | Kosmowski | |
| 2010/0147812 A1 | 6/2010 | Beck et al. | |
| 2010/0147814 A1 | 6/2010 | Watanabe | |
| 2011/0049113 A1 | 3/2011 | Glaesemann et al. | |
| 2011/0076405 A1 | 3/2011 | Raji et al. | |
| 2011/0240615 A1 | 10/2011 | Suruceanu et al. | |
| 2012/0074105 A1 | 3/2012 | Okamoto et al. | |
| 2013/0020292 A1 | 1/2013 | Elfizy et al. | |
| 2013/0146570 A1 | 6/2013 | Forsman et al. | |
| 2013/0206739 A1 | 8/2013 | Reed et al. | |
| 2014/0075755 A1 | 3/2014 | Hu et al. | |
| 2014/0076857 A1 | 3/2014 | Hu et al. | |
| 2014/0076868 A1 | 3/2014 | Hu et al. | |
| 2015/0052751 A1 * | 2/2015 | Hu | B23K 26/389 29/889.721 |

FOREIGN PATENT DOCUMENTS

| | | |
|---|---|---|
| GB | 2113592 | 8/1983 |
| WO | WO 99/56907 | 11/1999 |

OTHER PUBLICATIONS

U.S. Appl. No. 14/592,217, filed Jan. 8, 2015.
U.S. Appl. No. 14/626,960, filed Feb. 20, 2015.
U.S. Appl. No. 14/592,304, filed Jan. 8, 2015.
U.S. Appl. No. 14/592,224, filed Jan. 8, 2015.
U.S. Appl. No. 14/592,232, filed Jan. 8, 2015.
U.S. Appl. No. 14/602,322, filed Jan. 22, 2015.
U.S. Appl. No. 14/602,324, filed Jan. 22, 2015.
U.S. Appl. No. 14/164,522, filed Jan. 27, 2014.
U.S. Appl. No. 14/164,539, filed Jan. 27, 2014.
U.S. Appl. No. 14/164,506, filed Jan. 27, 2014.
Sensors-2012, ISSN 1424-8220; On Line Estimation of Laser-Drilled Hole Depth Using a Machine Vision Method, Chao-Ching Ho et al., Published Jul. 27, 2012, pp. 10148-10162.

* cited by examiner

SYSTEM AND METHOD FOR FORMING A COOLING HOLE IN AN AIRFOIL

FIELD OF THE INVENTION

The present invention generally involves a system and method for manufacturing an airfoil. More specifically, the present invention involves a system and method for cutting or forming cooling holes in the airfoil.

BACKGROUND OF THE INVENTION

The efficiency of a gas turbine generally increases with increased combustion gas temperatures. However, excessive temperatures within the turbine may reduce the longevity of the airfoils in the turbine and may thus increase repairs, maintenance, and outages associated therewith. As a result, various designs and methods have been developed to provide cooling to the airfoils. For example, a thermal barrier coating may be applied to an outer surface of the airfoil to enhance thermal protection. In particular designs, a cooling or purge medium may be supplied to a cavity or cooling circuit that is formed inside the airfoil to convectively and/or conductively remove heat from the airfoil. The purge medium generally flows in a flow direction which is substantially parallel to an inner surface of the cavity.

Cooling holes may be formed in the airfoil and may provide for fluid communication of the purge/cooling medium out of the cooling circuit and onto or across the outer surface of the airfoil, thus providing film cooling to the outer surface. The cooling holes generally extend through the outer surface and the inner surface of the cavity. In particular configurations, the cooling holes also extend through the thermal barrier coating.

The cooling holes are often drilled or machined into the high alloy metal of the airfoil at precise locations and in precise geometries after casting to optimize the cooling media flow over the airfoil. In particular instances, at least some of the cooling holes are drilled into the airfoil at various angles. For example, the cooling holes may be angled with respect to the outer surface of the airfoil, the inner surface of the cavity, the purge medium flow direction and/or with respect to a radial plane that extends perpendicularly to an axial plane of the airfoil.

Various processes are known for forming the cooling holes. For example, a liquid-jet guided laser may be used to create the cooling holes through the airfoil with a reduced risk of chipping the thermal barrier coating. The cooling hole forms in a generally conical fashion as the laser beam ablates the airfoil material. As a result, the laser beam will initially penetrate the inner wall of the cavity before the cooling hole is fully formed. A purge medium may be used to flush or purge the cavity of grit or other by-products which may form therein during the cutting process.

Because the cooling holes are generally angled or oriented such that a centerline of the cooling hole forms an obtuse angle with respect to the purge medium flow direction, the purge medium will flow or back-flow into the partially formed cooling hole around the laser beam, thus displacing the fluid column and preventing a properly formed cooling hole. As a result, the airfoil may require additional machining or may be scrapped, thus increasing time and/or costs to manufacture the airfoil. Therefore an improved system and method for manufacturing an airfoil, particularly for cutting or forming cooling holes within the airfoil would be useful.

BRIEF DESCRIPTION OF THE INVENTION

Aspects and advantages of the invention are set forth below in the following description, or may be obvious from the description, or may be learned through practice of the invention.

One embodiment of the present invention is a system for forming cooling holes in an airfoil. The system includes a liquid-jet guided laser having a laser beam confined within a fluid column. The fluid column and the laser beam are directed at an outer surface of the airfoil. The system also includes a purge medium supply that is fluidly coupled to an aperture of the airfoil. The purge medium supply provides a purge medium into an inner cavity of the airfoil. The purge medium flow is oriented to flow in a flow direction that is substantially parallel to an inner surface of the cavity. A cooling hole is formed in the airfoil and extends through the outer surface and penetrates the inner surface of the cavity. A centerline of the cooling hole forms an acute angle with respect to the purge medium flow direction.

Another embodiment of the present invention is a method for system for forming cooling holes in an airfoil. The method includes flowing a purge medium through an aperture that is defined proximate to a tip portion of the airfoil and into a cavity that is defined under an outer surface of the airfoil. The purge medium flows or is oriented in a flow direction that is substantially parallel to an inner surface of the cavity. The method further includes directing a laser beam confined within a fluid column at the outer surface of the airfoil. The laser beam forms a cooling hole through the outer surface of the airfoil and the inner surface of the cavity such that the fluid column and the laser beam penetrate into the cavity. A centerline of the cooling hole forms an acute angle with respect to the purge medium flow direction.

In yet another embodiment of the present invention, a method for manufacturing an airfoil is provided. The method includes flowing a purge medium through an aperture defined proximate to a root portion of the airfoil and into a cavity that is defined under an outer surface of the airfoil. The purge medium flows or is oriented in a flow direction that is substantially parallel to an inner surface of the cavity. The method further includes directing a laser beam confined within a fluid column at the outer surface of the airfoil. The laser beam forms a cooling hole through the outer surface of the airfoil and the inner surface of the cavity such that the fluid column and the laser beam penetrate into the cavity. A centerline of the cooling hole forms an acute angle with respect to the purge medium flow direction. The method further includes scattering the fluid column and the laser beam within the cavity via the purge medium.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
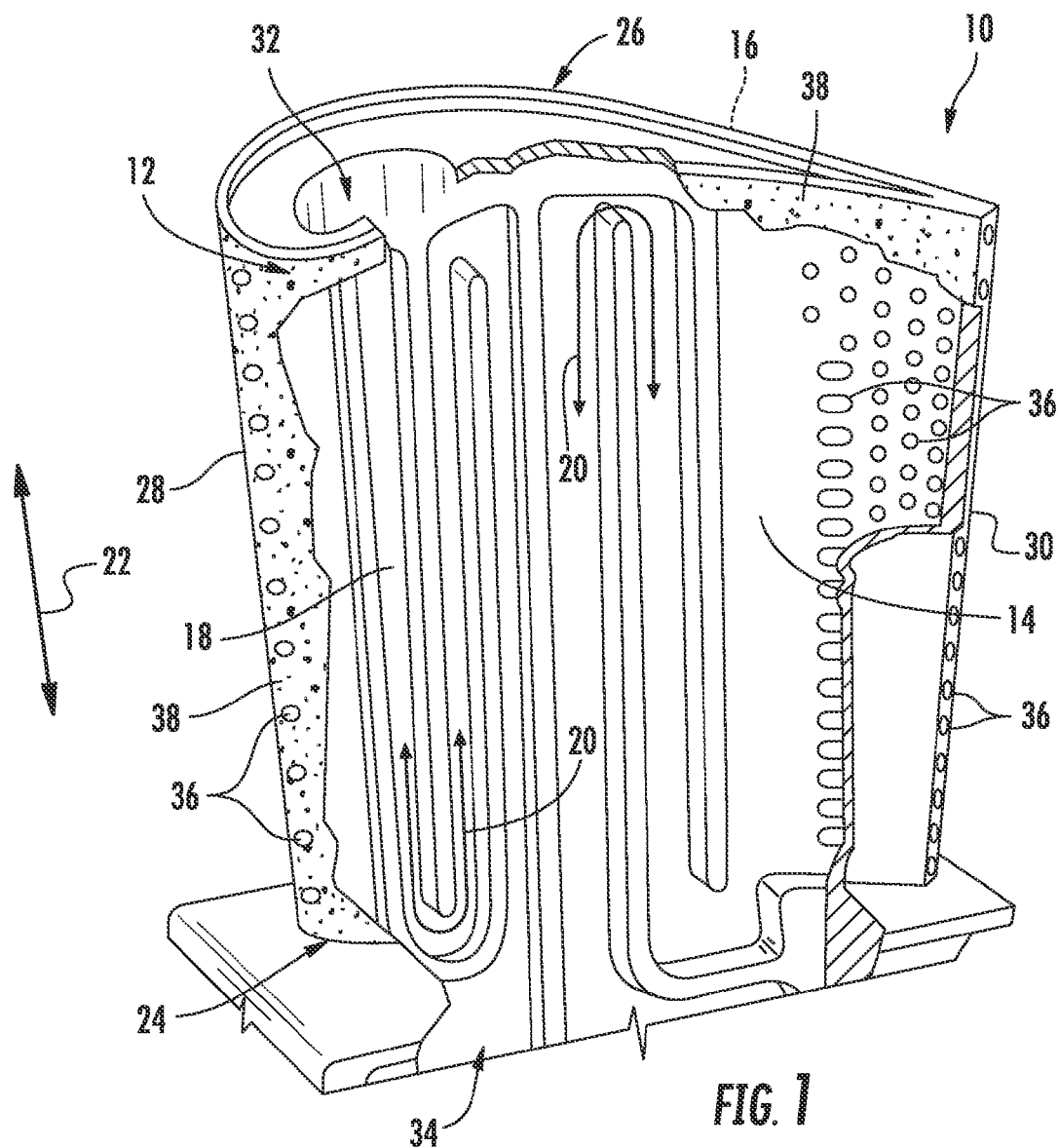
FIG. 1 is a perspective partial cross sectional view of an exemplary airfoil according to an embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, the terms "upstream" and "downstream" refer to the relative location of components in a fluid or optical pathway. For example, component A is upstream from component B if a fluid flows or a laser beam travels from component A to component B. Conversely, component B is downstream from component A if component B receives a fluid flow or laser beam from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 provides a perspective view of an exemplary airfoil 10, such as may be incorporated into a turbine or other aeromechanical device. As shown in FIG. 1, the airfoil 10 generally includes an outer surface 12 defining a pressure side 14 and a suction side 16 of the airfoil 10. The pressure side 14 has a generally concave curvature, and the suction side 16 has a generally convex curvature opposed to the pressure side 14. The pressure and suction sides 14, 16 are separated from one another to define a cavity 18 such as a cooling circuit inside the airfoil 10.

The cavity 18 may provide a serpentine or tortuous path or cooling circuit for directly a purge or cooling medium 20 inside the airfoil 10 to conductively and/or convectively remove heat from the airfoil 10. The pressure and suction sides 14, 16 extend radially in span 22 between a root portion 24 and a tip portion 26 of the airfoil 10. The pressure and suction sides 14, 16 further join to form a leading edge 28 at an upstream portion of the airfoil 10 and a trailing edge 30 at a downstream portion of the airfoil 10. The leading and trailing edges 28, 30 extend radially in span 19 between the root and tip portions 24, 26.

The exemplary airfoil 10 shown in FIG. 1 may be manufactured using any process known in the art. For example, the airfoil 10 may be manufactured by forging, machining, welding, extruding, and/or casting methods readily known in the art. The airfoil 10 may be manufactured from one or more high alloy metals which may include, for example, nickel, cobalt, and/or iron super alloys such as GTD-111, GED-222, Rene 80, Rene 41, Rene 125, Rene 77, Rene N5, Rene N6, PWA 1484, PWA 1480, 4th generation single crystal super alloy, MX-4, Hastelloy X, cobalt-based HS-188, and similar alloys.

In particular embodiments, the airfoil 10 includes one or more apertures which at least partially define a flow path into the cavity 18. The aperture may be positioned at any point along the airfoil 10 and positioning of the aperture is not specifically limited any particular position unless otherwise recited in the claims. For example, in one embodiment the airfoil 10 includes an aperture 32 defined and/or disposed proximate to the tip portion 26 of the airfoil 10. In one embodiment, the airfoil 10 includes an aperture 34 defined and/or disposed proximate to the root portion 24 of the airfoil 10.

In order to provide cooling to the airfoil 10, a plurality of cooling holes 36 may be formed or cut along each or any of the pressure side 14, suction side 16, leading edge 28, and/or trailing edge 30. The cooling holes 36 may provide for fluid communication from the cavity 18 through the outer surface 12 of the airfoil 10 to supply a cooling media across the outer surface 12 of the airfoil 10, thus providing for film cooling thereof. One of ordinary skill in the art will readily appreciate from the teachings herein that the number and/or location of the cooling holes 36 may vary according to particular embodiments, and the present invention is not limited to any particular number or location of cooling holes 36 unless specifically recited in the claims.

As shown in FIG. 1, in particular embodiments, a thermal barrier coating 38 may be applied over at least a portion of the outer surface 12 of the airfoil 10. The thermal barrier coating 38 may include low emissivity or high reflectance coatings for heat resistance, a smooth finish, and/or good adhesion to the underlying outer surface 12. For example, thermal barrier coatings known in the art include metal oxides, such as zirconia ($ZrO_2$), partially or fully stabilized by yttria ($Y_2O_3$), magnesia (MgO), or other noble metal oxides.

The selected thermal barrier coating 38 may be deposited by conventional methods using air plasma spraying (APS), low pressure plasma spraying (LPPS), or a physical vapor deposition (PVD) technique, such as electron beam physical vapor deposition (EBPVD), which yields a strain-tolerant columnar grain structure. The selected thermal barrier coating 38 may also be applied using a combination of any of the preceding methods to form a tape which is subsequently transferred for application to the underlying substrate, as described, for example, in U.S. Pat. No. 6,165,600, assigned to the same assignee as the present invention.

Figure 2:
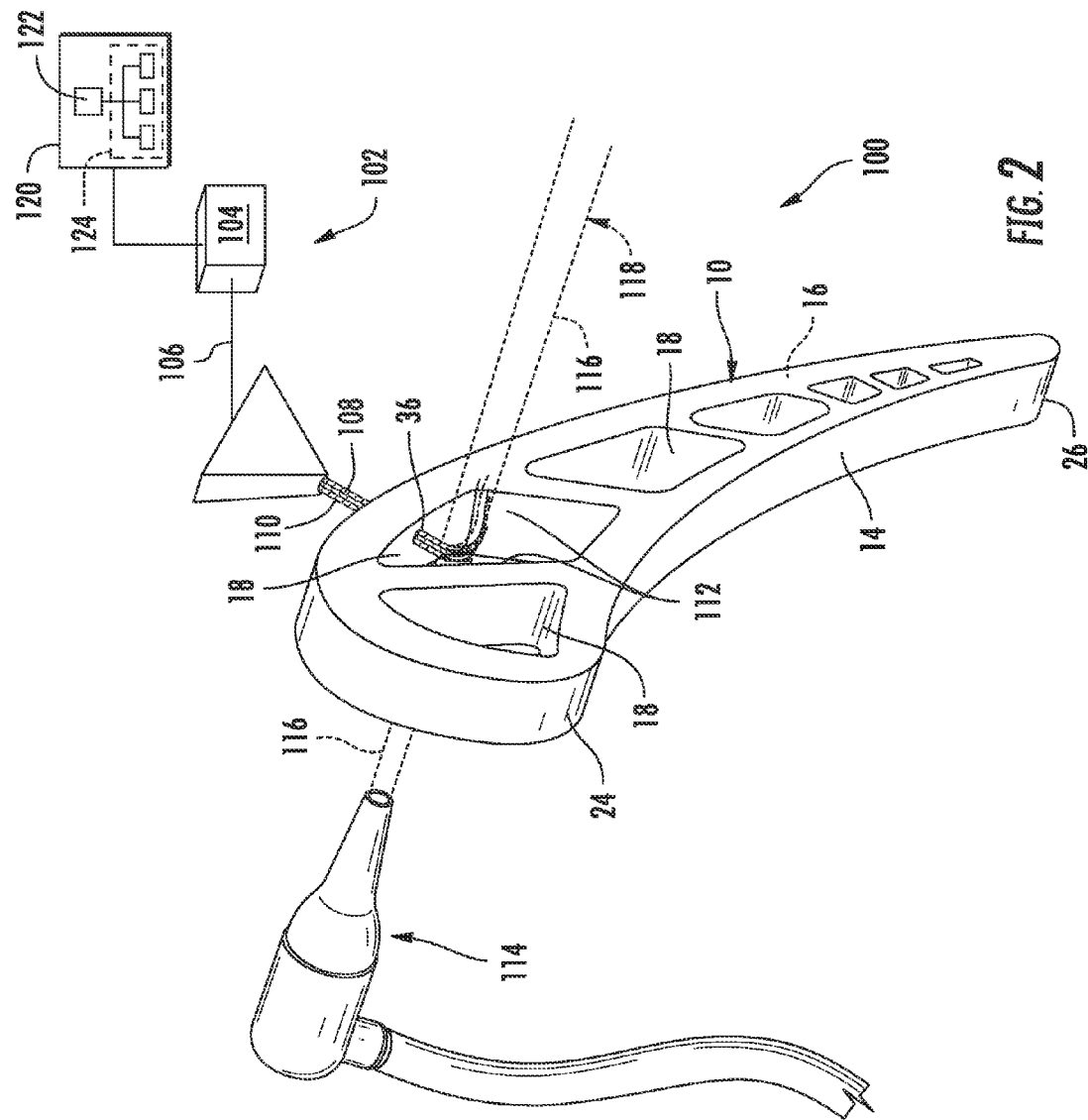
FIG. 2 is a perspective view of a system for forming cooling holes in an airfoil according to at least one embodiment of the present invention.

FIG. 2 provides a perspective view of a system 100 for forming cooling holes in an airfoil 10. As shown in FIG. 2, the system 100 may include a liquid-jet guided laser 102. The liquid-jet guided laser 102 generally includes a laser 104 capable of generating an unfocused laser beam 106. In exemplary configurations, the unfocused laser beam 106 may have a wavelength of approximately 532 nm, a pulse frequency of approximately 10 kHz, and an average power of approximately 40-50 W.

As shown in FIG. 2, the liquid-jet guided laser 102 is configured to direct the unfocused laser beam 106 into or through a fluid column 108. The laser beam 106 and the fluid column 108 are directed toward the airfoil 10. In particular configurations, the fluid column 108 may comprise a liquid such as deionized water which is capable of focusing the unfocused laser beam 106. The fluid column 108 may have a pressure in the range of approximately 700-1,500 pounds per square inch, although the present invention is not limited to any particular pressure for the fluid column 108 unless specifically recited in the claims. The fluid column 108 acts as a light guide for the unfocused laser beam 106 to create a focused or confined laser beam 110 that may be directed at the airfoil 10. The confined laser beam 110 ablates the outer surface 12 of the airfoil 10 and/or the thermal barrier coating 38 when present, eventually penetrating an inner or inside surface 112 of the cavity and creating the desired cooling hole 36 through the airfoil 10.

In particular embodiments, the system 100 includes a purge medium supply 114 fluidly coupled to the cavity 18 via aperture 32 or aperture 34 (FIG. 1). The purge medium supply 114 provides a purge medium 116 through the aperture 32, 34 into the cavity 18. As used herein, the term "purge medium" may include any gaseous or liquid medium. For example, the purge medium 116 may include an inert gas, a liquid, a saturated steam, a superheated steam or any other suitable medium which may form a purge medium column 118 inside the airfoil 10. As shown in FIG. 2, the purge medium 116 may be aligned to intersect with the fluid column 108 and/or the confined laser beam 110 inside the cavity 18 of the airfoil 10.

The purge medium 116 flowing inside the airfoil 10 may have a pressure roughly commensurate with the pressure of the fluid column 108 and which is sufficient to disrupt the fluid column 108 and/or the confined laser beam 110 inside the airfoil 10. For example, the purge medium 116 flowing inside the cavity 18 may have a pressure greater than approximately twenty five pounds per square inch, although the present invention is not limited to any particular pressure for the purge medium 116 unless specifically recited in the claims. In one embodiment, the pressure within the cavity 18 is maintained or varied between twenty five and eighty pounds per square inch.

In particular embodiments, flow speed of the purge medium 116 through the cavity 18 may be constant or varied during the cutting or forming process. The flow speed may be based on various factors. For example, the flow speed of the purge medium 116 may be based at least in part on wall thickness of the airfoil 10. Wall thickness may be defined as a thickness or distance between the outer surface 12 or thermal barrier coating 38 and the inner surface 112 of the cavity 18. In one embodiment, the flow speed is at least two inches per second for a wall thickness of between eight and ten millimeters. In one embodiment, where the flow speed is at least two inches per second for a wall thickness of between eight and ten millimeters, the pressure of the purge medium within the cavity may be between twenty five and eighty pounds per square inch.

In particular embodiments, as shown in FIG. 2, the system 100 includes a controller 120 in electronic communication with the liquid-jet guided laser 102. The controller 120 may be any suitable processor-based computing device. For example, suitable controllers may include personal computers, mobile phones (including smart phones), personal digital assistants, tablets, laptops, desktops, workstations, game consoles, servers, other computers and/or any other suitable computing devices. As shown in FIG. 2, the controller 120 may include one or more processors 122 and associated memory 124. The processor(s) 122 may generally be any suitable processing device(s) known in the art. Similarly, the memory 124 may generally be any suitable computer-readable medium or media, including, but not limited to, RAM, ROM, hard drives, flash drives, or other memory devices.

As is generally understood, the memory 124 may be configured to store information accessible by the processor(s) 122, including instructions or logic that can be executed by the processor(s) 122. The instructions or logic may be any set of instructions that when executed by the processor(s) 122 cause the processor(s) 122 to provide the desired functionality. For instance, the instructions or logic can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Figure 3:
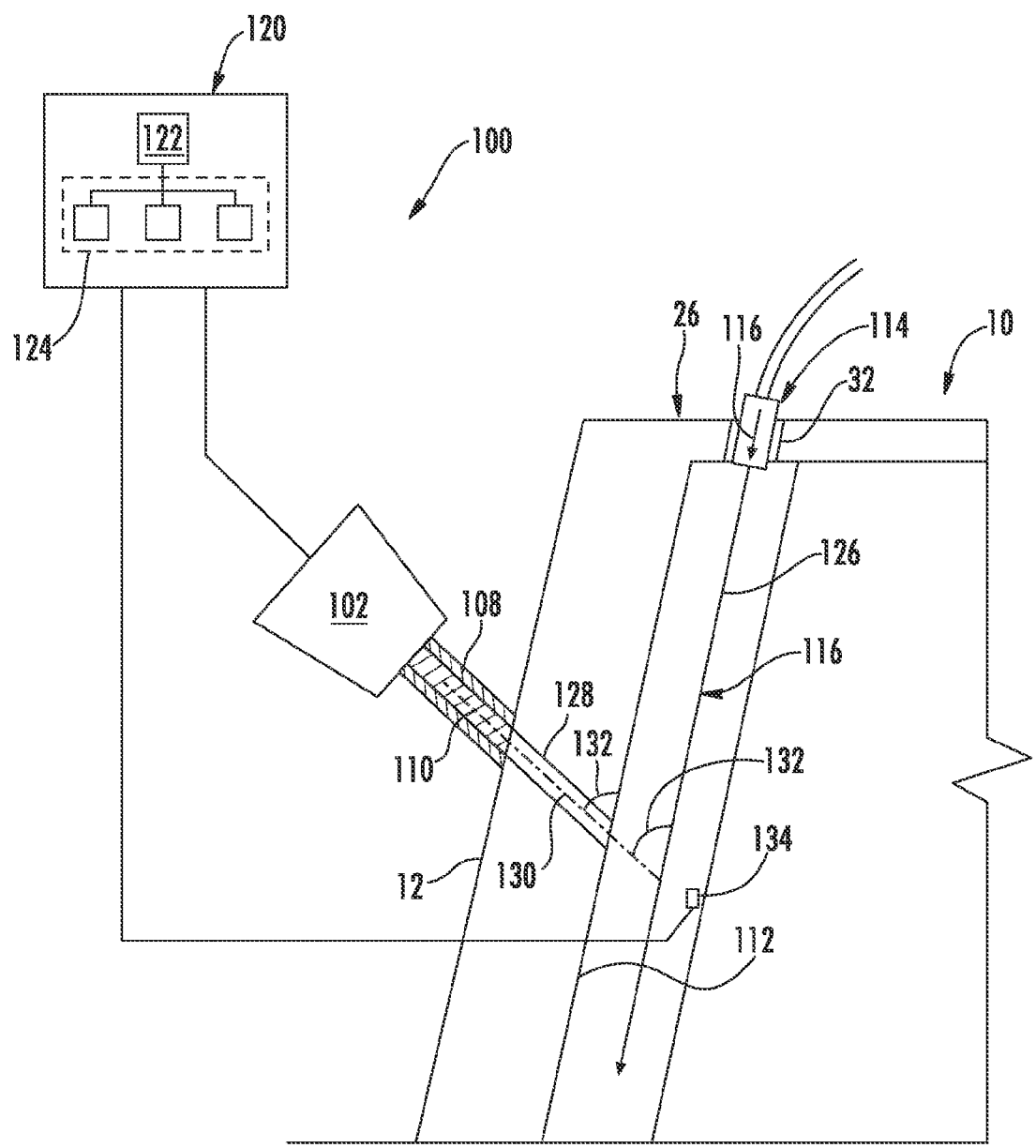
FIG. 3 is a side view of an exemplary airfoil according including a system for forming cooling holes in an airfoil as shown in FIG. 2, according to one embodiment of the present invention.

FIG. 3 provides a side view of an exemplary airfoil 10 according to at least one embodiment of the present invention. In one embodiment, as shown in FIG. 3, the purge medium supply 114 is fluidly coupled to the cavity 18 via aperture 32 proximate to the tip portion 26 of the airfoil 10. The purge medium supply 114 is oriented to provide or direct the purge medium 116 into the inner cavity 18 of the airfoil 10 such that the purge medium 116 flows in a flow direction 126 that is substantially parallel to the inner surface 112 of the cavity 18.

A cooling hole 128 is formed in the airfoil 10 via the liquid-jet guided laser 102 such that the cooling hole 128 extends through the outer surface 12 and penetrates through the inner surface 112 of the cavity 18. The cooling hole 128 is formed such that a centerline 130 of the cooling hole 128 forms an acute angle 132 with respect to at least one of the inner surface 112 of the cavity 18 and the purge medium flow direction 126. The acute angle 132 of the cooling hole 128 prevents premature blow-through of the purge medium 116 from the cavity 18 prior to complete formation of the cooling hole 128, for example, when the laser beam 110 initially penetrates the inner surface 112 of the cavity 18.

The purge medium 116 intersects the fluid column 108 and/or the confined laser beam 110 inside the cavity 18, thus disrupting the fluid column 108 and/or scattering the confined laser beam 110. In this manner, the purge medium 116 prevents the confined laser beam 110 from striking the inner surface 112 of the cavity 18 across from the newly formed cooling hole 128. In particular embodiments, a sensor 134 electronically coupled to the controller 120 may be disposed within the cavity 18 to detect and/or send an electronic signal to the controller 120 that is indicative of penetration of the laser beam 110 through the inner surface 112 and/or into the cavity 18.

The sensor 134 may include a light sensor, an acoustic sensor or any sensor suitable for detecting penetration of the laser beam 110 through the inner surface 112. In this embodiment, the controller 120 may execute logic stored in the memory 124 that directs the liquid-jet guided laser 102 to increase power of the laser beam, decrease power to the laser beam, increase fluid pressure of the fluid column, increase or decrease pressure or flow speed of the purge medium to the cavity 18 or take other suitable actions to ensure a proper formation of the cooling hole 128 while preventing back strike of the laser beam against the inner surface 112 of the cavity 18.

The acute angle 132 may be any angle less than ninety degrees which prevents or restricts premature backflow into the cooling hole prior to full formation thereof. For example, in one embodiment the acute angle 132 is equal to or less than about sixty five degrees. In one embodiment the acute angle 132 is equal to or less than about forty five degrees. In one embodiment, the acute angle 132 is equal to or less than about thirty degrees.

Figure 4:
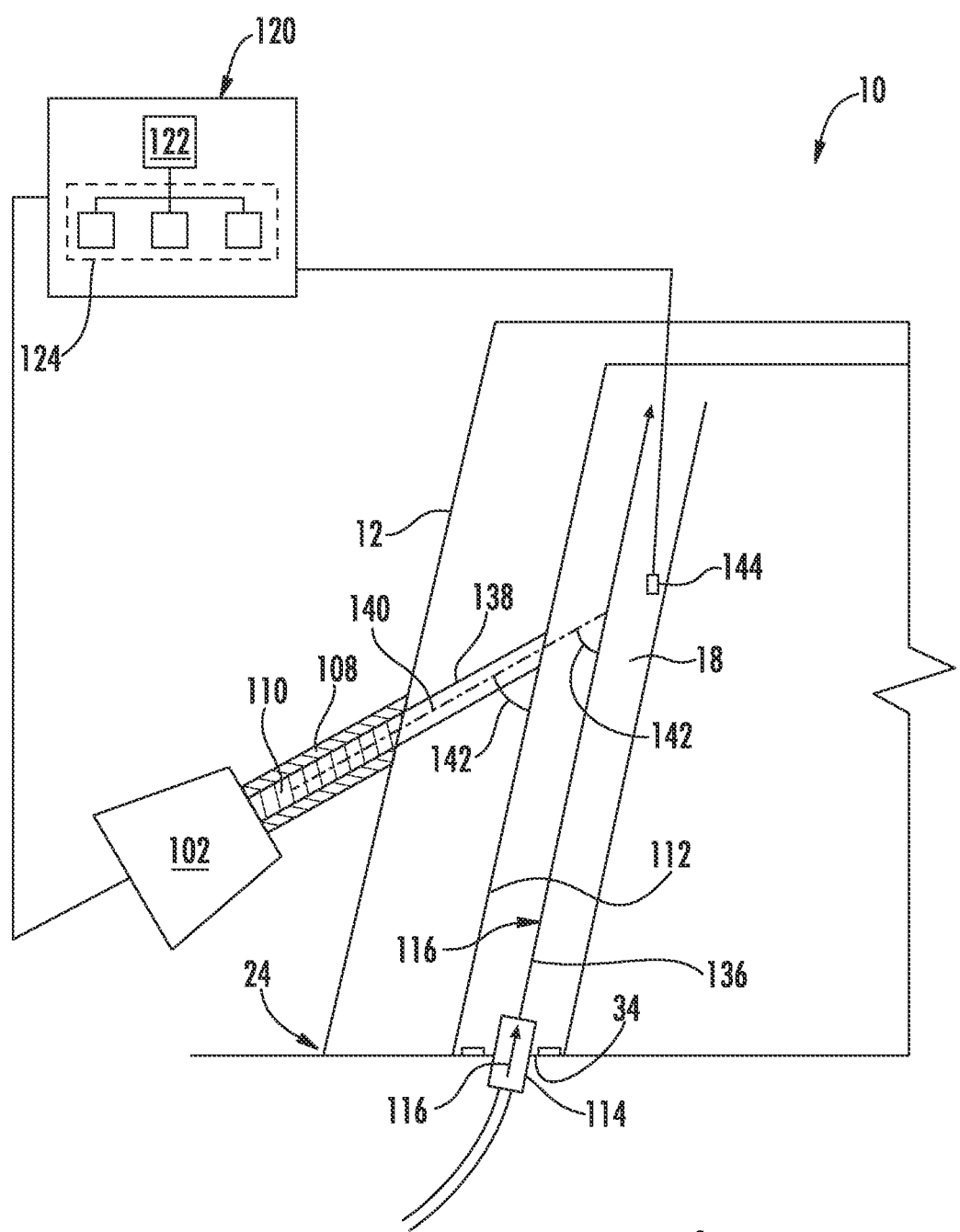
FIG. 4 is a side view of an exemplary airfoil according including a system for forming cooling holes in an airfoil as shown in FIG. 2, according to one embodiment of the present invention.

FIG. 4 provides a side view of an exemplary airfoil 10 according to at least one embodiment of the present invention. In one embodiment, as shown in FIG. 4, the purge medium supply 114 is fluidly coupled to the cavity 18 via aperture 34 proximate to the root portion 24 of the airfoil 10. The purge medium supply 114 is oriented to provide or direct the purge medium 116 into the inner cavity 18 of the airfoil 10 such that the purge medium 116 flows in a flow direction 136 that is substantially parallel to the inner surface 112 of the cavity 18.

A cooling hole 138 is formed in the airfoil 10 via the liquid-jet guided laser 102 such that the cooling hole 138 extends through the outer surface 12 and penetrates through the inner surface 112 of the cavity 18. The cooling hole 138 is formed such that a centerline 140 of the cooling hole 138 forms an acute angle 142 with respect to at least one of the inner surface 112 of the cavity 18 and the purge medium flow direction 136. The acute angle 142 of the cooling hole 138 prevents premature blow-through of the purge medium 116 from the cavity 18 prior to complete formation of the cooling hole 136, for example, when the laser beam 110 initially penetrates the inner surface 112 of the cavity 18.

The purge medium 116 intersects the fluid column 108 and/or the confined laser beam 110 inside the cavity 18, thus disrupting the fluid column 108 and/or scattering the confined laser beam 110. In this manner, the purge medium 116 prevents the confined laser beam 110 from striking the inner surface 112 of the cavity 18 across from the newly formed cooling hole 136. In particular embodiments, a sensor 144 electronically coupled to the controller 120 may be disposed within the cavity 18 to detect and/or send an electronic signal to the controller 120 that is indicative of penetration of the laser beam 110 through the inner surface 112 and/or into the cavity 18.

The sensor 144 may include a light sensor, an acoustic sensor or any sensor suitable for detecting penetration of the laser beam 110 through the inner surface 112. In this embodiment, the controller 120 may execute logic stored in the memory 124 that directs the liquid-jet guided laser 102 to increase power of the laser beam, decrease power to the laser beam, increase fluid pressure of the fluid column, increase or decrease pressure or flow speed of the purge medium to the cavity 18 or take other suitable actions to ensure a proper formation of the cooling hole 136 while preventing back strike of the laser beam against the inner surface 112 of the cavity 18.

The acute angle 142 may be any angle less than ninety degrees which prevents or restricts premature backflow into the cooling hole prior to full formation thereof. For example, in one embodiment the acute angle 142 is equal to or less than about sixty five degrees. In one embodiment the acute angle 142 is equal to or less than about forty five degrees. In one embodiment, the acute angle 142 is equal to or less than about thirty degrees.

Figure 5:
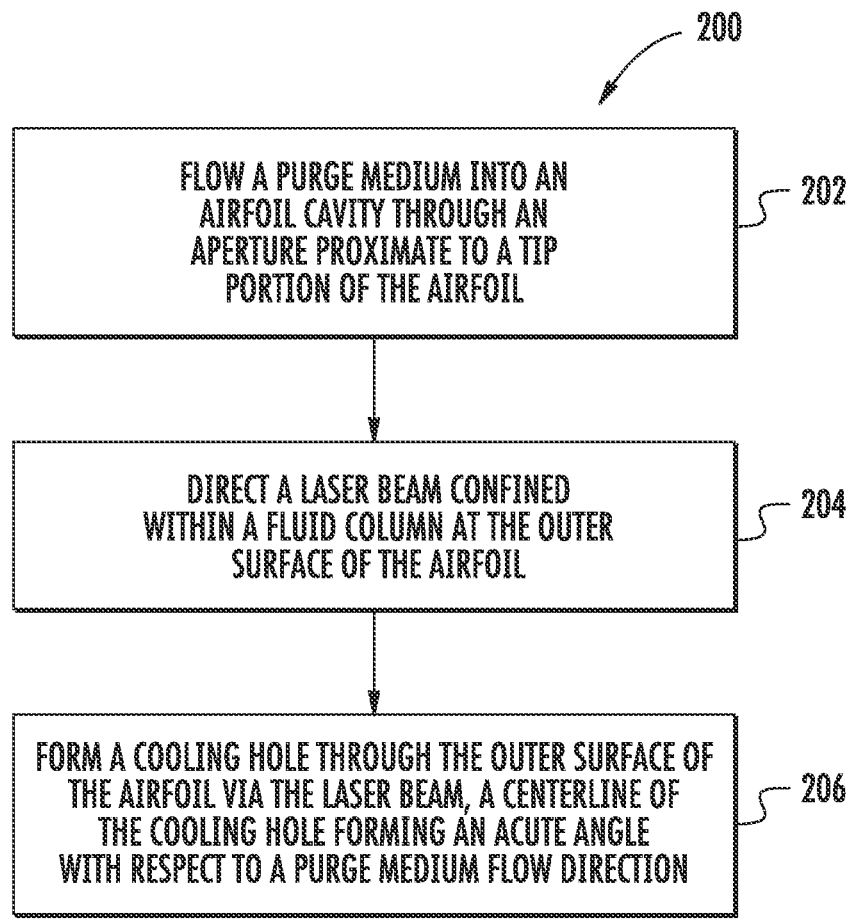
FIG. 5 is block diagram of an exemplary method for forming cooling holes in an airfoil according to one embodiment of the present invention.

The system 100 as illustrated in FIGS. 2, 3 and 4 and as described herein provide a method for manufacturing an airfoil. FIG. 5 provides a flow diagram of an exemplary method 200 according to one embodiment of the present invention. At 202, method 200 includes flowing the purge medium 116 through aperture 32 defined proximate to the tip portion 26 of the airfoil 10 and into the cavity 18 defined under the outer surface 12 of the airfoil 10 such that the purge medium 116 flows in a flow direction 126 that is substantially parallel to the inner surface 112 of the cavity 18. At 204, method 200 includes directing the laser beam 110 confined within the fluid column 108 at the outer surface 12 of the airfoil 10. At 206, method 200 includes forming cooling hole 128 through the outer surface 12 and the inner surface 112 of the cavity 18 via the laser beam 110 such that the fluid column 108 and the laser beam 110 penetrate into the cavity 18. The cooling hole 128 is formed such that the centerline 130 of the cooling hole 128 forms acute angle 132 with respect to the purge medium flow direction 126.

Method 200 may also include disrupting at least one of the fluid column 108 and the laser beam 110 within the cavity 18 via the purge medium 116. In one embodiment of method 200, the purge medium 116 flowing within the cavity 18 is provided at a pressure that is between twenty five and eighty pounds per square inch. In one embodiment, Method 200 incudes flowing the purge medium 116 within the cavity 18 at a flow speed of at least two inches per second. Method 200 may also include aligning the purge medium flow direction 126 so as to be substantially perpendicular to the fluid column 108 inside the cavity 18. In one embodiment, wherein flowing the purge medium 116 through the aperture 32 defined along the tip portion 26 of the airfoil 10 and into the cavity 18, method 200 may include flowing at least one of steam, a liquid and an inert gas into the cavity 18. In one embodiment, method 200 may include generating a signal that is indicative of breakthrough of the laser beam 110 through the inner surface 112 via the sensor 134 where the sensor 134 is in electronic communication with the controller 120 and where the controller 120 executes a command to start, stop or vary the flow speed of the purge medium 116 based on the signal.

Figure 6:
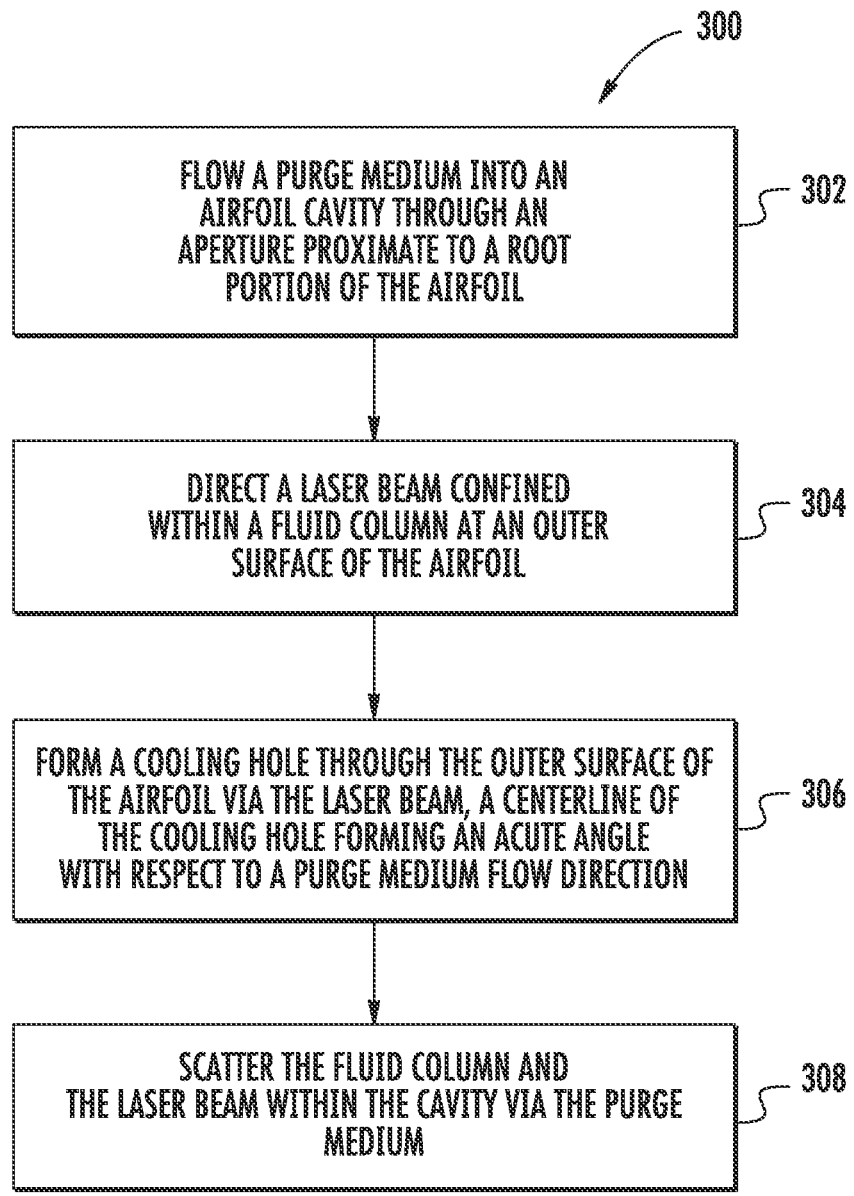
FIG. 6 is block diagram of an exemplary method for forming cooling holes in an airfoil according to one embodiment of the present invention.

FIG. 6 provides a flow diagram of an exemplary method 300 for manufacturing an airfoil according to one embodiment of the present invention. At 302, method 300 includes flowing the purge medium 116 through the aperture 34 defined proximate to the root portion 24 of the airfoil 10 and into cavity 18 such that the purge medium 116 flows in a flow direction 136 that is substantially parallel to the inner surface 112 of the cavity 18. At 304, method 300 includes directing the laser beam 110 confined within the fluid column 108 at the outer surface 12 of the airfoil 10. At 306, method 300 includes and forming cooling hole 138 through the outer surface 12 of the airfoil 10 and the inner surface 112 of the cavity 18 such that the fluid column 108 and the laser beam 110 penetrate into the cavity 18. The cooling hole 138 is formed such that the centerline 140 of the cooling hole 138 forms acute angle 142 with respect to the purge medium flow direction 136. At 308. Method 300 includes scattering the fluid column 108 and/or the laser beam 110 within the cavity 18 via the purge medium 116.

In one embodiment of method 300, the purge medium 116 flowing within the cavity 18 is provided at a pressure that is between twenty five and eighty pounds per square inch. In one embodiment, method 300 includes flowing the purge medium 116 within the cavity 18 at a flow speed of at least two inches per second. Method 300 may also include aligning the purge medium flow direction 136 so as to be substantially perpendicular to the fluid column 108 and/or the laser beam 110 inside the cavity 18. In one embodiment, method 300 may include flowing at least one of steam, a liquid and an inert gas into the cavity. In one embodiment, method 300 may include flowing the purge medium 116 into the cavity 18 at a pressure greater than 25 pounds per square inch. In one embodiment of method 300 the acute angle is less than about 65 degrees. In one embodiment, method 300 may include generating a signal that is indicative of breakthrough of the laser beam 110 through the inner surface 112 via the sensor 144 where the sensor 144 is in electronic communication with the controller 120 and where the controller 120 executes a command to start, stop or vary the flow speed of the purge medium 116 based on the signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for forming cooling holes in an airfoil, comprising:
    a liquid jet guided laser including a laser beam confined within a fluid column, wherein the fluid column and the laser beam are directed at an outer surface of the airfoil;
    a purge medium supply fluidly coupled to an aperture of the airfoil, the purge medium supply providing a purge medium into an inner cavity of the airfoil, wherein the purge medium flows in a flow direction that is substantially parallel to an inner surface of the cavity; and
    a cooling hole formed in the airfoil, the cooling hole extending through the outer surface and penetrating the inner surface of the cavity, wherein a centerline of the cooling hole forms an acute angle with respect to the purge medium flow direction.

2. The system as in claim 1, wherein the aperture is positioned proximate to a tip portion of the airfoil and the purge flow.

3. The system as in claim 1, wherein the aperture is positioned proximate to a root portion of the airfoil.

4. The system as in claim 1, wherein the acute angle is less than about 65 degrees.

5. The system as in claim 1, wherein the purge medium has a pressure within the cavity of between twenty five and eighty pounds per square inch.

6. The system as in claim 1, wherein the purge medium flows through the cavity at a flow speed of at least two inches per second.

7. The system as in claim 1, wherein the purge medium intersects with the fluid column inside the airfoil cavity.

8. A method for forming cooling holes in an airfoil, comprising:
    flowing a purge medium through an aperture defined proximate to a tip portion of the airfoil into a cavity defined under an outer surface of the airfoil, wherein the purge medium flows in a flow direction that is substantially parallel to an inner surface of the cavity;
    directing a laser beam confined within a fluid column at the outer surface of the airfoil; and
    forming a cooling hole through the outer surface of the airfoil and an inner surface of the cavity via the laser beam such that the fluid column and the laser beam penetrate into the cavity, wherein a centerline of the cooling hole forms an acute angle with respect to the purge medium flow direction.

9. The method as in claim 8, further comprising disrupting the fluid column and the laser beam within the cavity via the purge medium.

10. The method as in claim 8, wherein the purge medium flowing within the cavity is at a pressure of between twenty five and eighty pounds per square inch.

11. The method as in claim 8, further comprising flowing the purge medium within the cavity at a flow speed of at least two inches per second.

12. The method as in claim 8, wherein flowing the purge medium through an aperture defined along the tip portion of the airfoil and into the cavity comprises flowing at least one of steam, a liquid and an inert gas into the cavity.

13. The method as in claim 8, wherein the acute angle is less than about 65 degrees.

14. The method as in claim 8, further comprising generating a signal that is indicative of breakthrough of the laser beam through the inner surface via a sensor disposed within the cavity, wherein the sensor is in electronic communication with a controller, wherein the controller executes a command to start, stop or vary the flow speed of the purge medium based on the signal.

15. A method for forming cooling holes in an airfoil, comprising:
    flowing a purge medium through an aperture defined proximate to a root portion of the airfoil into a cavity defined under an outer surface of the airfoil, wherein the purge medium flows in a flow direction that is substantially parallel to an inner surface of the cavity;
    directing a laser beam confined within a fluid column at the outer surface of the airfoil;
    forming a cooling hole through the outer surface of the airfoil and an inner surface of the cavity via the laser beam such that the fluid column and the laser beam penetrate into the cavity, wherein a centerline of the cooling hole forms an acute angle with respect to the purge medium flow direction; and
    scattering the fluid column and the laser beam within the cavity via the purge medium.

16. The method as in claim 15, wherein the purge medium flowing within the cavity is at a pressure of between twenty five and eighty pounds per square inch.

17. The method as in claim 15, further comprising flowing the purge medium within the cavity at a flow speed of at least two inches per second.

18. The method as in claim 15, wherein the acute angle is less than about 65 degrees.

19. The method as in claim 15, further comprising generating a signal that is indicative of breakthrough of the laser beam through the inner surface via a sensor disposed within the cavity, wherein the sensor is in electronic communication with a controller, wherein the controller executes a command to start, stop or vary the flow speed of the purge medium based on the signal.

20. The method as in claim 15, wherein flowing the purge medium through an aperture defined along the tip portion of the airfoil and into the cavity comprises flowing at least one of steam, a liquid and an inert gas into the cavity.

* * * * *